US012685979B2

(12) United States Patent
Duffin

(10) Patent No.: US 12,685,979 B2
(45) Date of Patent: Jul. 21, 2026

(54) MANUAL AMALGAMATOR FOR COMPOUNDS

(71) Applicant: Marcus Duffin, Hillsboro, OR (US)

(72) Inventor: Marcus Duffin, Hillsboro, OR (US)

(73) Assignee: NODK, LLC, Wilsonville, OR (US)

( * ) Notice: Subject to any disclaimer, the term of this patent is extended or adjusted under 35 U.S.C. 154(b) by 911 days.

(21) Appl. No.: 18/054,310

(22) Filed: Nov. 10, 2022

(65) Prior Publication Data

US 2024/0157314 A1     May 16, 2024

(51) Int. Cl.
| | |
|---|---|
| *B01F 35/32* | (2022.01) |
| *A61C 5/68* | (2017.01) |
| *B01F 31/24* | (2022.01) |
| *B01F 35/212* | (2022.01) |
| *B01F 35/221* | (2022.01) |
| *B01F 101/19* | (2022.01) |

(52) U.S. Cl.
CPC .............. *B01F 35/325* (2022.01); *A61C 5/68* (2017.02); *B01F 31/24* (2022.01); *B01F 35/212* (2022.01); *B01F 35/22161* (2022.01); *B01F 35/3202* (2022.01); *B01F 2101/19* (2022.01)

(58) Field of Classification Search
CPC ...... A61C 5/68; B01F 35/3202; B01F 35/212; B01F 35/22161; B01F 31/24; B01F 2101/19
See application file for complete search history.

(56) References Cited

U.S. PATENT DOCUMENTS

| | | | | |
|---|---|---|---|---|
| 814,196 | A * | 3/1906 | Forsyth | B01F 31/24 |
| | | | | 366/212 |
| 1,204,849 | A * | 11/1916 | Daniel | B01F 31/24 |
| | | | | 366/212 |
| 1,230,040 | A * | 6/1917 | Scott | B01F 31/24 |
| | | | | 366/240 |
| 1,242,218 | A * | 10/1917 | McCann | B01F 31/24 |
| | | | | 366/212 |
| 3,610,586 | A | 10/1971 | Price | |
| 4,197,646 | A | 4/1980 | Morrison | |
| 4,199,866 | A | 4/1980 | Drury | |
| 5,273,357 | A * | 12/1993 | Currie | B01F 35/423 |
| | | | | 366/128 |
| 5,338,114 | A | 8/1994 | Steele | |
| 2018/0028989 | A1* | 2/2018 | Henry | B44D 3/08 |
| 2024/0123413 | A1* | 4/2024 | Martin | B01F 31/441 |

* cited by examiner

*Primary Examiner* — Marc C Howell
(74) *Attorney, Agent, or Firm* — Harpman + Harpman

(57) ABSTRACT

A dental amalgamator for automatic controlled manual mixing of compound capsules with operator controlled rotated drive input. The manual amalgamator comprises a self-contained capsule holder and integral gear drive means with a capsule access and placement. Controlled drive input determines proper capsule associated speed and duration assuring proper capsule preparation in a lightweight self-contained portable user-friendly platform.

7 Claims, 7 Drawing Sheets

MANUAL AMALGAMATOR FOR COMPOUNDS

BACKGROUND OF THE INVENTION

1. Technical Field

This invention relates to automatically controlled amalgamators for preparing compound capsules used in dentistry practice.

2. Description of Prior Art

Prior art amalgamators heretofore typically require complicated power devices utilizing microprocessor controls, electric motors and mechanical linkage to meet the key parameters such as mixing speed and times depending on capsule types. The devices often combine mixing and dispensing with optimum handling properties. See for example U.S. Pat. Nos. 3,610,586, 4,197,646, and 4,199,866 and 5,338,114.

In U.S. Pat. No. 3,610,586 a dental mixing arrangement is disclosed in which prepackaged ingredients are initially isolated and are intermixed by mixing container configurations by rotation of container bottom.

U.S. Pat. No. 4,197,646 is directed to a dental amalgamator to retain mercury lost during operation and containment control of mercury vapors.

U.S. Pat. No. 4,199,866 claims a dental amalgamator apparatus that prevents mercury vapor from polluting the air by enclosing the capsule hold and power drive means.

Finally, U.S. Pat. No. 5,338,114 is directed to a mixing arm assembly for automatic capsule mixing devices that utilize arm control to a mechanical mixer.

The present invention is directed to portable self-contained manual mixing devices for dental materials that provide required mixing parameters of time and speed based on control of manual rotational input.

SUMMARY OF THE INVENTION

In accordance with the present invention, an amalgamator for capsules containing dental materials is provided which is controlled by manual user input. The self-contained portable amalgamator directs the user to the corresponding correct rotational input speed and mixing time by visual illumination indicators that provide unambiguous light cues as to the cranking speed and duration as it is achieved. A compound gear and linkage assembly converts rotational input to linear oscillation (shaking) the capsule as required.

DETAILED DESCRIPTION OF THE INVENTION

Figures 1, 2:
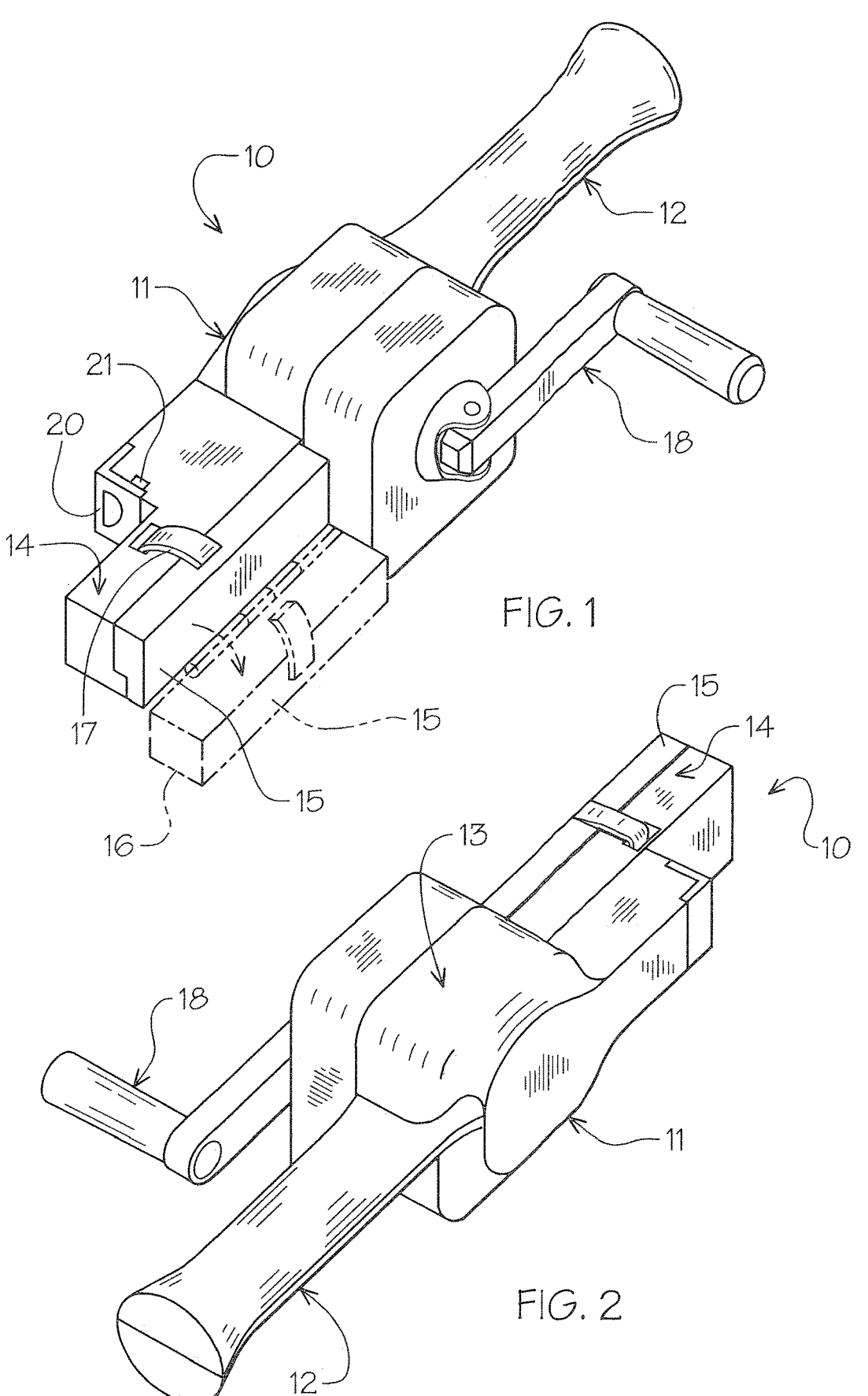
FIG. 1 is a perspective top, right and end view of the dental compound mixer with the access door shown in open position in broken lines.
FIG. 2 is a bottom, and left side view of the dental compound mixer in closed operational position.
Figure 3:
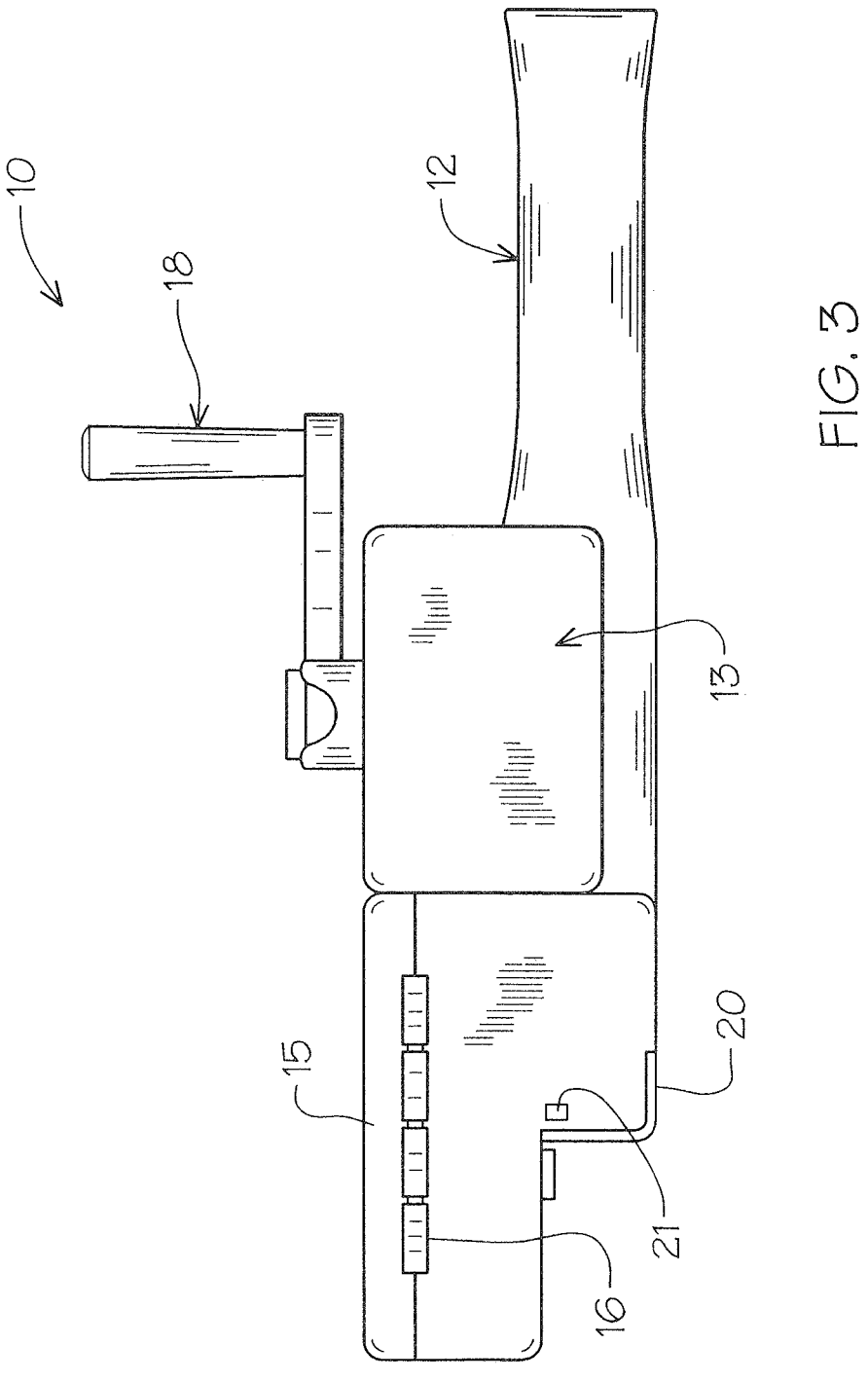
FIG. 3 is a bottom plan view thereof.

Referring to FIGS. 1, 2 and 3 of the drawings, a dental product mixer 10 (amalgamator) can be seen having a main housing 11 with a handgrip portion 12, gear receiving portion 13 and a product capsule carrier portion 14. A capsule carrier cartridge access door 15 is illustrated being hinged at 16 through the carrier portion of the main housing with a closure latch fitting 17.

An activation crank and handle 18 extends from the gear receiving portion 13 providing manual rotation drive input to a gear box assembly by the operator, not shown.

A sensor battery access door 20 is provided and hinged on the corner of the capsule carrier portion 14 with an activation light window 21 positioned adjacent thereto as best seen in FIGS. 1 and 3 of the drawings.

Figure 6:
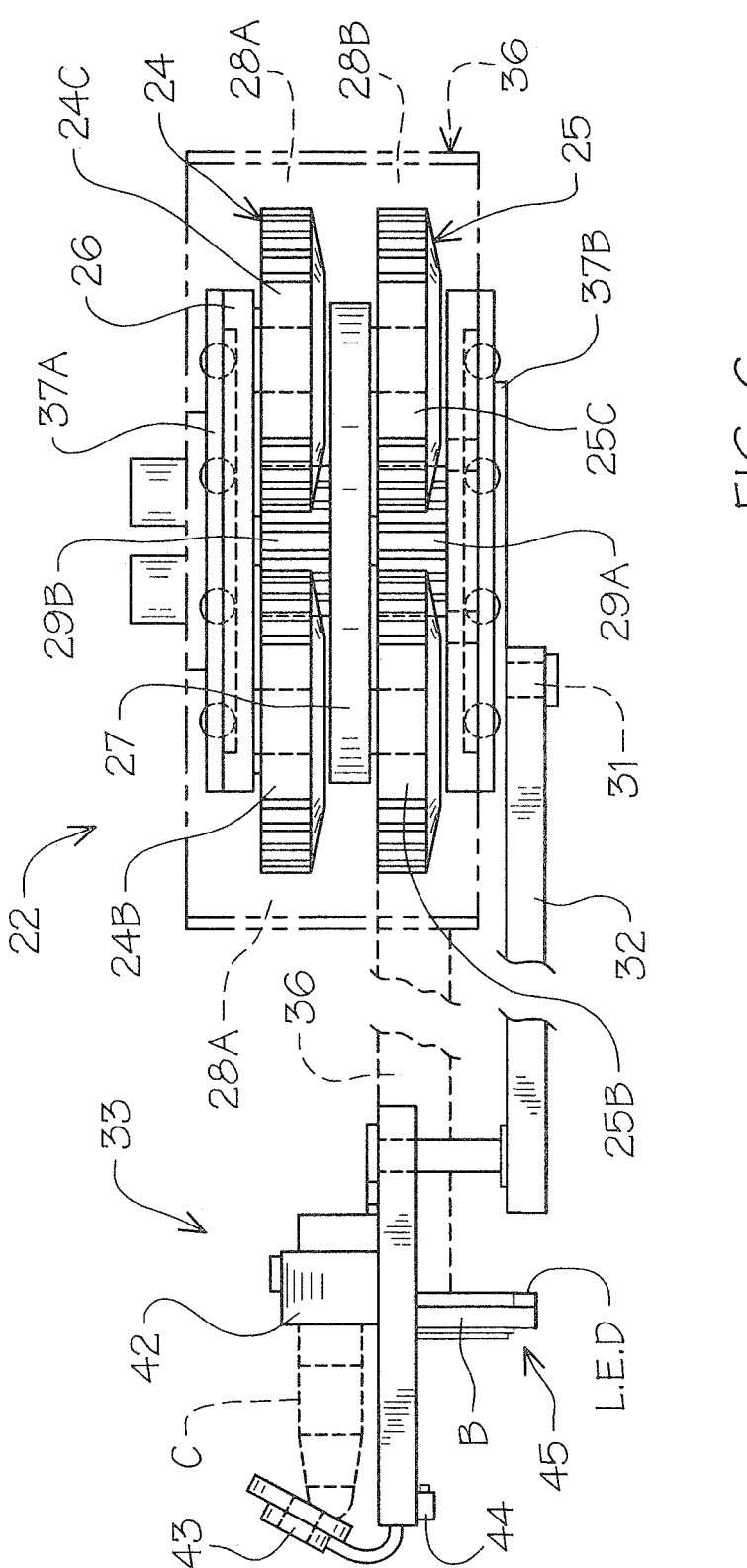
FIG. 6 is a partial top plan view of the dual drive gear assembly and product carrier with portions broken away for illustration.
Figure 7:
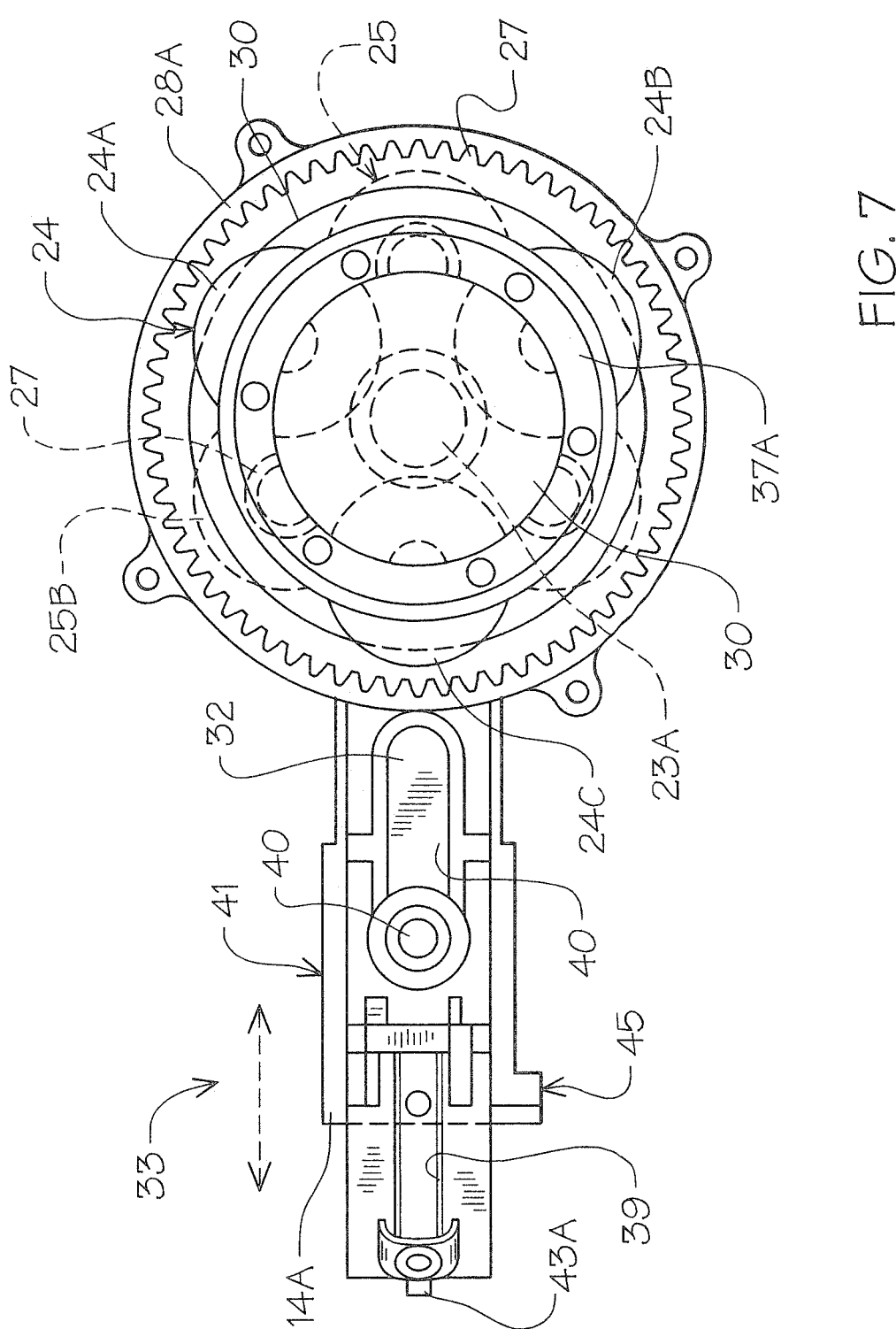
FIG. 7 is a top plan view of the dual planetary gear assembly and reciprocation linkage with the product carrier with portions of the housing and crank handle shown in broken lines.
Figure 8:
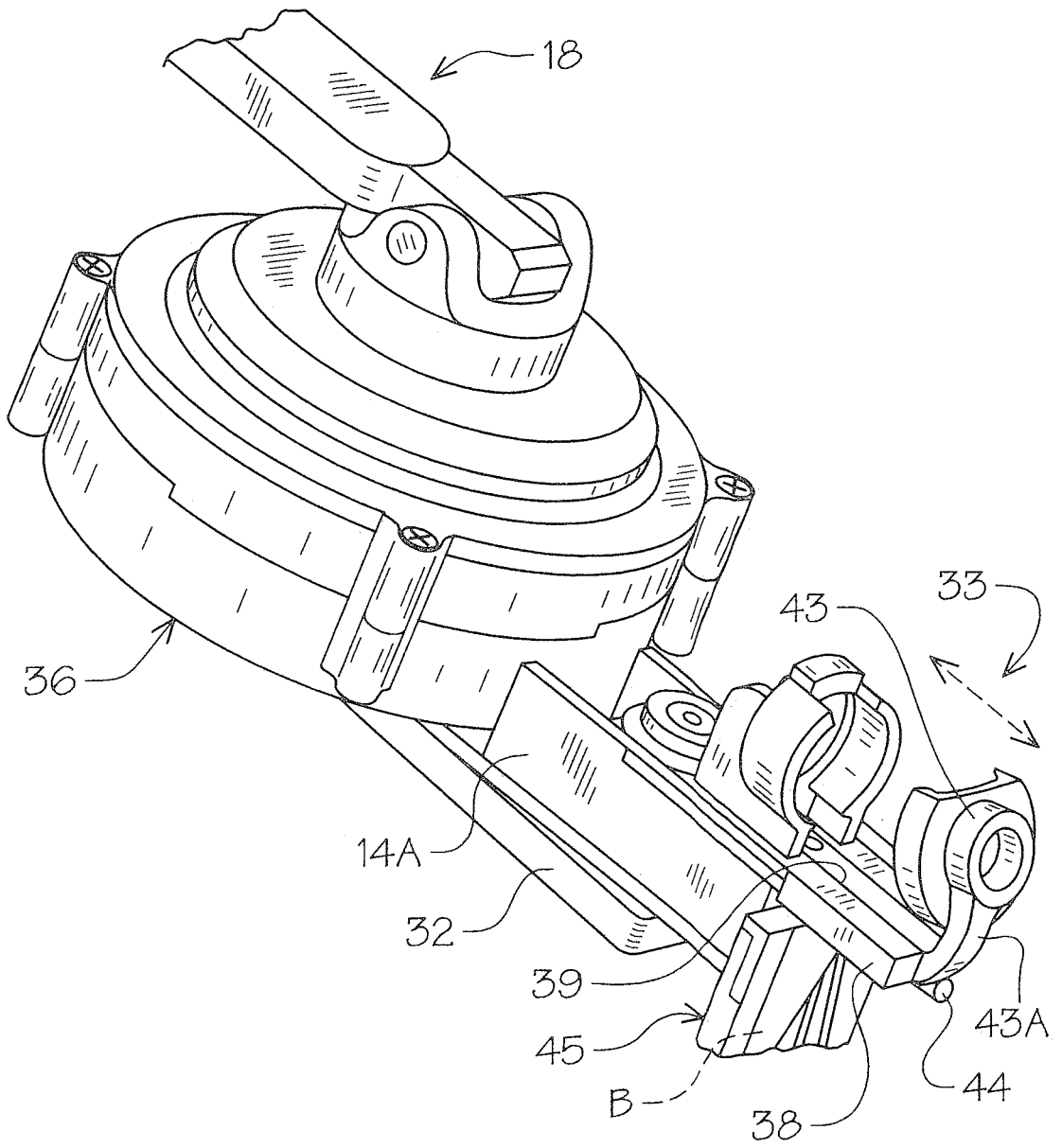
FIG. 8 is a partial perspective with the product carrier and an assembled gear box assembly with operational drive component crank thereon.

The gear receiving portion 13 of the housing and the capsule carrying portion 14 are configured to receive a drive gear assembly 22 and an extending capsule carrier assembly 33 respectively, as seen in FIGS. 6, 7 and 8 of the drawings.

Figure 4:
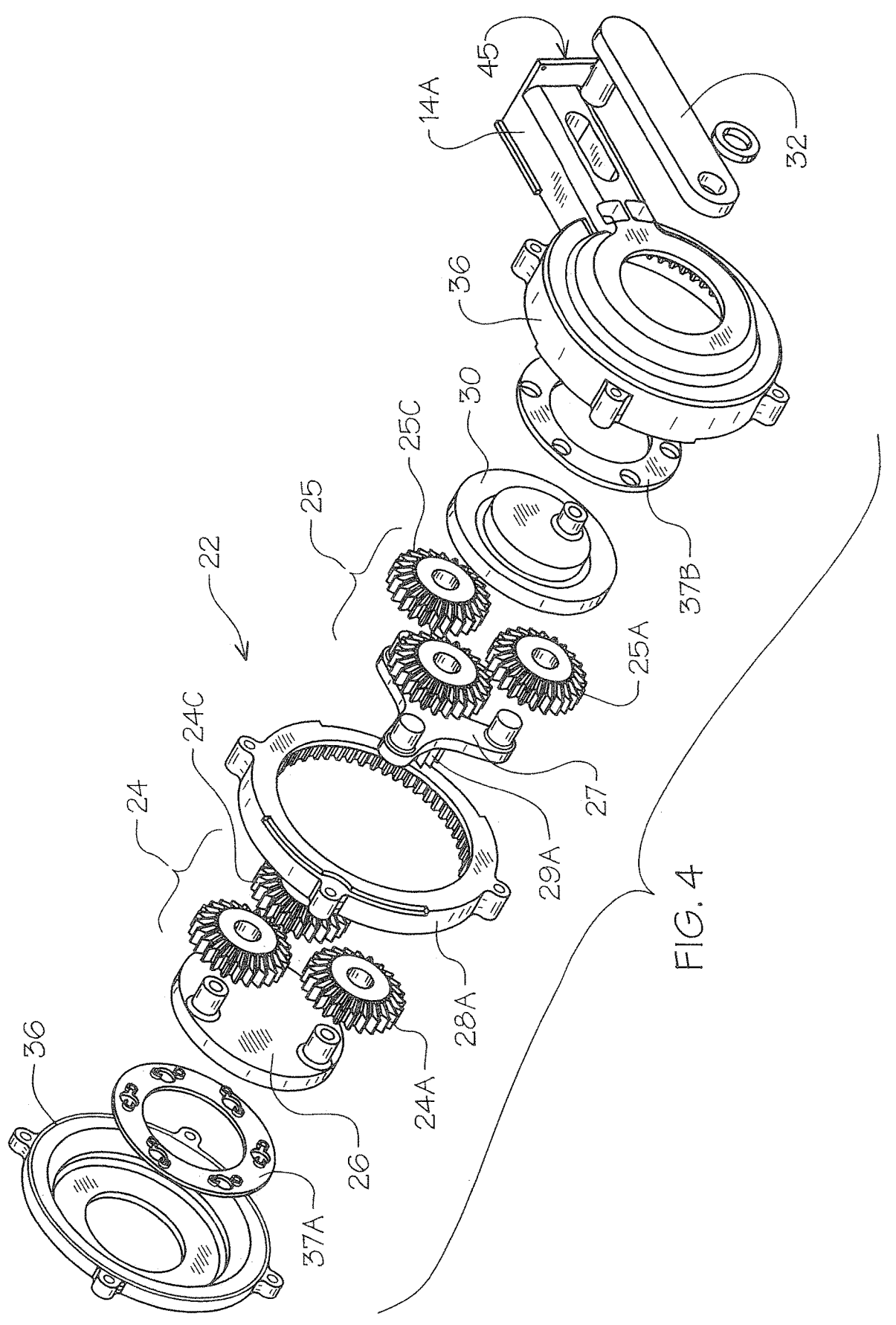
FIG. 4 is an exploded perspective view of the planetary gear box assembly and the linear crank reciprocating linkage.
Figure 5:
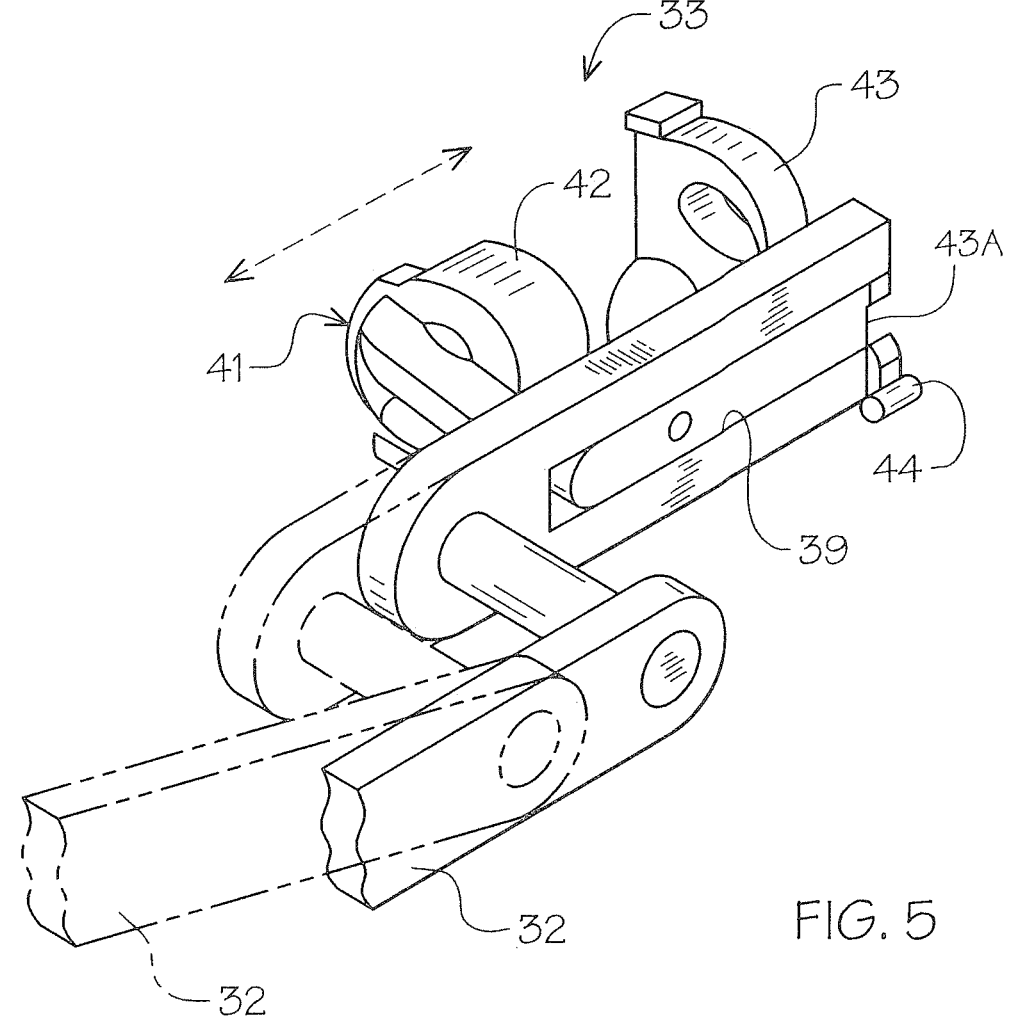
FIG. 5 is an enlarged perspective bottom view of a portion of the reciprocation linkage and product carrier.

The drive gear assembly 22 has as a pair of interengaged planetary gear sets 24 and 25, as best seen in FIGS. 4, 6 and 7 of the drawings. Each of the planetary gear sets 24 and 25 have multiple planetary gears 24A, 24B and 24C and 25A, 25B and 25C respectively on respective gear carriers 26 and 27. Fixed ring gears 28A and 28B are engaged on their respective planetary gear sets transferring rotational output to respective sun gears 29A and 29B driven by their corresponding planetary gear sets. The gear carrier 26 is driven by the activation crank and handle 18 as seen in and solid lines in FIGS. 1, 3 and 8 of the drawings.

Correspondingly, the sun gear 29A and the fixed ring gear 28A complete the planetary gear set 24 and therefore transfer rotational speed and torque of the input crank and handle 18 to the sun gear 29A as speed variation output drive typically in a three to one ratio. The planetary gear set 25, shown in broken lines in FIG. 7 and solid lines in FIGS. 4 and 6 of the drawings is, in turn, driven by the sun gear 29A which output is in direct contact with the gear set 25 on a gear carrier 27. Rotation of the gear carrier 27 drives the respective planetary gears 25A, 25B and 25C within the secondary fixed ring gear 28B within a two-part gear assembly housing 36 as best seen in FIGS. 4, and 6 of the drawings. The planetary gear set 25, again in a ratio of three to one, sun gear 29B drives an annular disk fitting 30 having an internally threaded eccentric bearing lug 31 thereon which in turn receives a pivoted drive arm 32 in communication with a capsule carrier assembly 33 as seen in FIGS. 6, 7 and 8 of the drawings. It will be evident from the foregoing that the interlinked dual planetary gear sets 24 and 25 will effectively act as a speed variation mechanism wherein increasing the rotational input of the crank and handle 18 converting same via the eccentric driven arm linkage 32 into linear oscillations of the capsule carrier assembly 33. Ring bearing assemblies 37A and 37B are positioned for respective engagement on the gear carrier 26 and annular disk fitting 30 and the respective oppositely disposed gear housing 36.

It will be seen that the capsule carrier assembly 33 being positioned within and supported by guide housing 14A that extends from the main gear housing 36 of the drive gear assembly 22 as seen in FIGS. 6, 7 and 8 of the drawings.

The capsule holder assembly 33 is configured of a base 38 having a mounting slot 39 within extending inwardly from its distal end with a drive arm linkage bearing fitting aperture 40 adjacent its proximal end. A fixed capsule holder 41 extends from the base 38 having an upstanding split annular cartridge base receiving fitting 42 and an apertured cartridge end receiving flexible clip 43 in spaced relation thereto. The clip 43 is angularly disposed vertically from the base 38 on a curved armature 43A that extends from within the mounting slot 39, best seen in FIGS. 6 and 8 of the drawings. The clip 43 so secured will flex longitudinally for placement and removal of a dental product cartridge C indicated generally in broken lines in FIG. 6 of the drawings.

A sensing magnet 44 is secured to the bottom of the base 38 of the capsule holder 41 to indicate the relative base positioning to be sensed by an activation indicator 45 secured on the capsule carrier portion 14 of the housing 11 to be adjacent the base 38 of the capsule holder assembly 33. The capsule activation indicator 45 has a control circuit configuration which includes a proximity sensor, a counter configuration, and a power activation circuit for a color LED which is so positioned as to be viewed through the hereinbefore described light window 21. A power source is provided by a small replaceable battery B accessible by the sensor battery access door 20 as noted.

The proximity sensor is activated by a magnet 44 on the base 38 as it oscillates within the capsule carrier portion 14 of the housing during operation.

It is noted that the capsule dental product cartridge C, in this application, is either glass ionomer cement capsules or amalgam capsules which have dental use materials used to fill cavities after clinical preparation, as is well known and understood within the dental art.

The respective capsule cartridges C require specific mixing parameters and time achieved acceptable use parameters.

In operational applications, the glass ionomer cement capsules typically require ten seconds of mixing at a given velocity while the amalgam capsules require fifteen seconds and therefore it is important to achieve and maintain oscillating velocity (shaking) required of the capsules. To achieve same, the chosen capsule is placed within the capsule holder 41 accessed through the access door 15. The crank and handle 18 is rotated by the operator, not shown, driving the dual planetary gear assemblies 24 and 25 and therefore the linear drive output of the drive arm 32 in communication with the capsule carrier assembly 33 as hereinbefore described. It will be seen, therefore, that once the input rotational speed required is reached, determined by the proximity sensor and magnet 44, a green LED is illuminated viewed through the window 21. As the rotation continues and the proper mixing oscillation (shaking) time has been reached, the illumination LED turns yellow indicating that mixing time is complete for a glass ionomer cement capsule.

If you are mixing an amalgam capsule which requires more time, continued rotation and the light will turn red when appropriate time is reached and therefore indicating mixing should stop and the capsule is ready for use.

In summary, the LED light color sequence is therefore green indicating mixing speed has been achieved. Yellow indicates mixing speed has been achieved and maintained for ten seconds. Continued rotational input for an additional five second will turn light red, LED light color stops when rotational input through handle 18 stops.

It will be evident, therefore, that the dental product mixer 10 of the invention will provide for a safe reliable mixing of both dental material capsules in a manual portable self-contained format. It assures that proper mixing is achieved by monitoring both the mixing speed required and as importantly the time required at the speed for different product methodologies. Thus, it will be seen that a new and novel dental product mixer 10 (amalgamator) has been illustrated and described and it will be apparent to those skilled in the art that various changes and modifications may be made therein without departing from the spirit of the invention.

Therefore I claim:

1. A portable dental mixing device comprising:
   a main support housing, a drive gear assembly having a rotational input and linear output,
   a product capsule carrying assembly in direct communication with said drive gear assembly such that said linear output of said drive gear causes linear oscillation of said product capsule carrying assembly,
   a sensing and timing means responsive to said linear oscillation of said product capsule carrying assembly, said sensing and timing means including a signal illumination that activates in response to said linear oscillation of said product capsule carrying assembly to indicate proper linear oscillation speed and duration has been achieved and maintained, and a source of power for said sensing and timing means.

2. The portable dental mixing device set forth in claim 1 wherein said main support housing comprises,
   a drive gear assembly receiving portion, a capsule carrier receiving portion with an access door and a handle grip portion.

3. The portable dental mixing device set forth in claim 1 wherein said drive gear assembly includes a first and second interconnected planetary gear set,
   a crank handle in communication with said first planetary gear set and an eccentric output with said second planetary gear set.

4. The portable dental mixing device set forth in claim 1 wherein said product capsule carrying assembly comprises,
   a capsule holder having a base, a fixed capsule receiving fitting and a movable capsule receiving clip in longitudinally spaced relation thereto on said base.

5. The portable mixing device set forth in claim 1 wherein said sensor and timing means comprises,
   a magnet and a proximity switch, a timing circuit and illumination activation circuit in communication with said proximity switch, a color LED in communication with said illuminated activation circuit,
   said LED color changes in response to said rotational input and therefore said capsule carrier assembly linear oscillation speed and duration.

6. The portable mixing device set forth in claim 1 wherein said source of power for said sensing and timing means comprises a battery.

7. The portable mixing device set forth in claim 3 wherein said first and second interconnected planetary gear sets each have a fixed ring gear, said eccentric output comprises a bearing lug, a drive arm in communication with said bearing lug and said capsule carrier assembly.

* * * * *